United States Patent
Tanoue (10) Patent No.: US 6,804,215 B1
(45) Date of Patent: Oct. 12, 2004

(54) CDMA RECEIVER

(75) Inventor: Katsumi Tanoue, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/553,476

(22) Filed: Apr. 20, 2000

(30) Foreign Application Priority Data

Apr. 21, 1999 (JP) .......................................... 11-113039

(51) Int. Cl.$^7$ .............................................. H04B 7/216
(52) U.S. Cl. ....................... 370/335; 370/342; 370/320; 375/150; 455/63.1; 455/501; 455/517; 455/67.11; 455/67.13; 455/570
(58) Field of Search .................................... 370/320, 335, 370/342, 441; 455/500, 501, 504, 517, 526, 63.1, 67.11, 67.13, 67.16, 570, 114.2, 226.1, 226.3, 230, 242.2; 375/130–150, 343–346

(56) References Cited

U.S. PATENT DOCUMENTS

| | | | | |
|---|---|---|---|---|
| 6,026,115 A | * | 2/2000 | Higashi et al. | 375/148 |
| 6,229,842 B1 | * | 5/2001 | Schulist et al. | 375/148 |
| 6,363,049 B1 | * | 3/2002 | Chung | 370/210 |
| 6,456,644 B1 | * | 9/2002 | Ramberg et al. | 375/130 |
| 6,501,788 B1 | * | 12/2002 | Wang et al. | 375/148 |
| 6,600,729 B1 | * | 7/2003 | Suzuki | 370/335 |

FOREIGN PATENT DOCUMENTS

| | | |
|---|---|---|
| EP | 0 756 387 | 1/1997 |
| EP | 0 823 796 | 2/1998 |
| EP | 1 033 823 | 9/2000 |
| JP | 9-135193 | 5/1997 |
| JP | 10-190494 | 7/1998 |
| JP | 11-274982 | 10/1999 |
| JP | 2000-68981 | 3/2000 |
| JP | 2000-82975 | 3/2000 |
| JP | 2000-216706 | 8/2000 |
| WO | WO 95/24086 | 9/1995 |
| WO | 98/29960 | 7/1998 |
| WO | WO 00/4648 | 1/2000 |

* cited by examiner

Primary Examiner—Chi Pham
Assistant Examiner—Thai Hoang
(74) Attorney, Agent, or Firm—Foley & Lardner LLP (57) ABSTRACT

In a CDMA receiver which receives, as a reception signal (33), a signal given by subjecting a data signal comprising predetermined pattern data (PS) to spread modulation by the use of a spread code, a correlation value calculating unit ($70_1$–$70_3$) produces correlation value data obtained by multiplying the reception signal by the spread code and the predetermined pattern data. A signal-to-interference ratio calculating portion (74) calculates a signal-to-interference ratio of the reception signal. A reception timing determining portion (76) determines a reception timing of the predetermined pattern data in response to the correlation value data and the signal-to-interference ratio. Preferably, the reception timing determining portion determines the reception timing such that the maximum value of said correlation value data exceeds a predetermined first threshold value and that said signal-to-interference ratio exceeds a predetermined second threshold value when said correlation value data have the maximum value.

3 Claims, 8 Drawing Sheets

| SAMPLING TIME (80) | CORRELATION VALUE LEVEL (81) | (79) |
|---|---|---|
| $T_1$ | $LV_0$ | |
| $T_2$ | $LV_1$ | |
| $T_3$ | $LV_2$ | |
| ⋮ | ⋮ | |
| $T_N$ | $LV_N$ | |

FIG. 6

| INTERPOLATING SAMPLING TIME (83) | SIR INFORMATION (84) | (82) |
|---|---|---|
| $T_m - T_n$ | $SIR_0$ | |
| $T_m - T_{n-1}$ | $SIR_1$ | |
| $T_m - T_{n-2}$ | $SIR_2$ | |
| ⋮ | ⋮ | |
| $T_m$ | $SIR_m$ | |
| ⋮ | ⋮ | |
| $T_m + T_n$ | $SIR_M$ | |

CDMA RECEIVER

BACKGROUND OF THE INVENTION

This invention relates to a receiver of a code-division multiple access system and, in particular, to a receiver of a code-division multiple access system intended to improve a reception quality.

In a conventional mobile communication system such as a mobile telephone, use has been made of a multiplexing system such as a time division multiple access (TDMA) system or a frequency division multiple access (FDMA) system. However, in response to a growing demand for effective use of frequencies following an increase in number of subscribers and for multimedia communications, attention is directed to a code division multiple access (hereinafter abbreviated to CDMA) system as a multiplexing system for a next-generation mobile telephone. The CDMA system is a technique for simultaneously carrying out a plurality of communications by the use of signals in a same frequency band by means of the spread spectrum technique. In a CDMA mobile communication system using the above-mentioned technique, a plurality of users occupy a same frequency and a same time and modulate communication data by the use of spread codes assigned to the users to identify the users. The spread codes of the users are orthogonal to one another. Therefore, at a receiving side a multiplexed signal obtained by multiplexing all user's communication data is multiplied by a spread code used by each user in a same phase so as to extract communication data of a desired user.

In the CDMA mobile communication system, a communication quality is determined by orthogonality of communication data signals of all users multiplexed In the same frequency. Practically, however, due to variation in a propagation condition, the orthogonality can not completely be maintained. Therefore, when the signal of the desired user is demodulated a signal component of another user is undesiredly contained to result in deterioration in signal quality. In order to avoid the deterioration in signal quality, the receiving side measures a ratio between a signal reception level and an interference reception level for the desired user and requests a transmitting side to change transmission power so as to satisfy a predetermined ratio. In this approach, a transmission level is increased at the transmitting side in order to maintain a predetermined signal-to-interference ratio (hereinafter abbreviated to SIR) at a CDMA receiver in the CDMA mobile communication system. However, increase in transmission level prevents the reduction in power consumption at a terminal and the improvement in degree of multiplexing into the same frequency. In order to solve the above-mentioned problem, attention is directed to an interference removing technique. In the interference removing technique, an interference wave, i.e., a signal component other than that of a desired user is removed from a communication data signal received. Thus, it is possible to improve a reception signal quality even in a low SIR condition.

Hereinafter, description will be made of a CDMA receiver using the interference removing technique. Herein, it is assumed that the CDMA receiver performs an interference removing operation of a multistage type in which interference removal is repeatedly carried out in three stages for three users.

Figure 1:
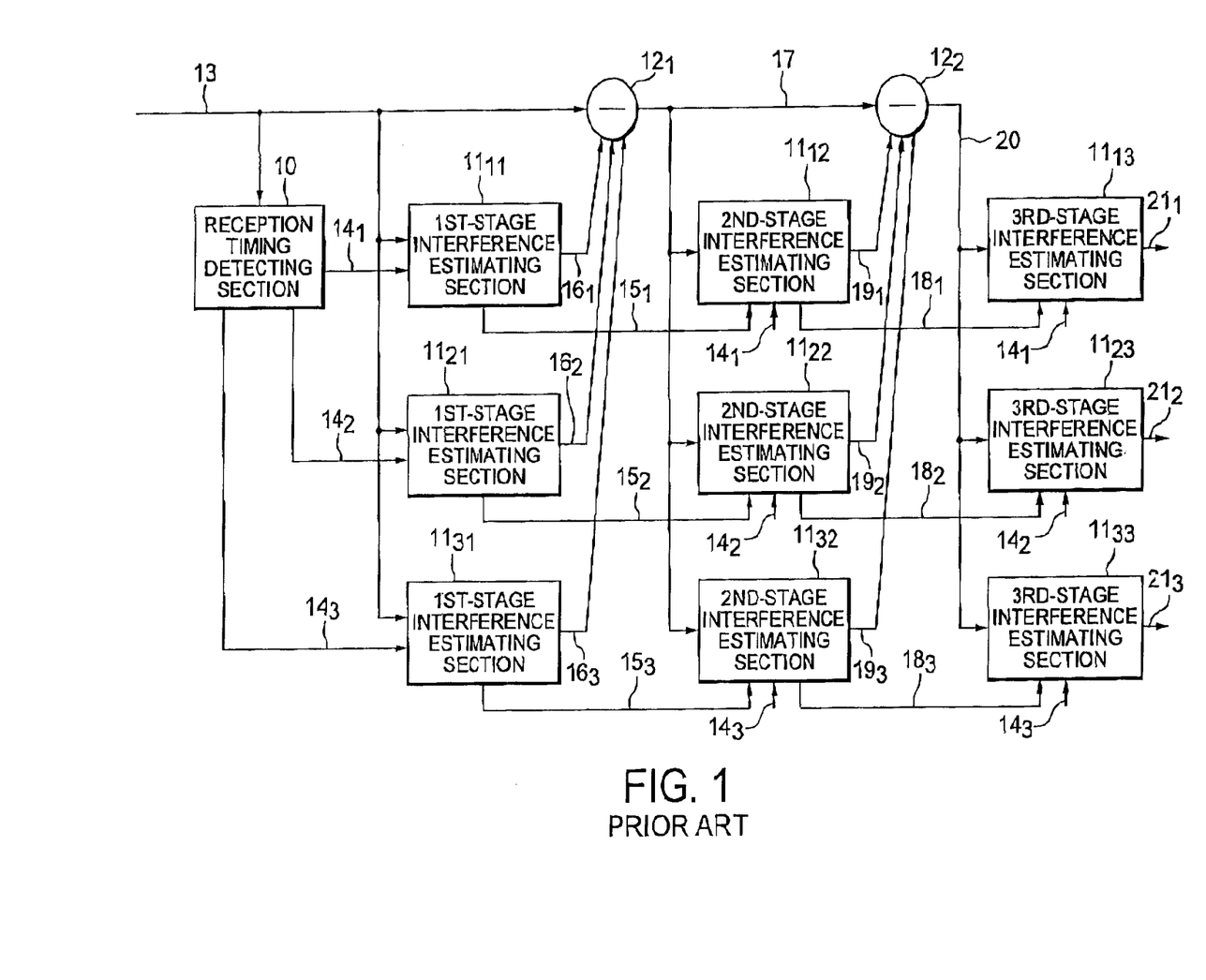
FIG. 1 is a view showing the structure of a conventional CDMA receiver.

FIG. 1 shows the structure of a conventional CDMA receiver for carrying out interference removal in a multi-stage fashion. The CDMA receiver comprises a reception timing detecting section 10 for detecting reception timings of three users and, in correspondence to the reception timings, interference estimating sections in each stage. The interference estimating sections includes first- through third-stage interference estimating sections $11_{11}$ through $11_{13}$ corresponding to the reception timing of a first user, first through third-stage interference estimating sections $11_{21}$ through $11_{23}$ corresponding to the reception timing of a second user, and first- through third-stage interference estimating sections $11_{31}$ to $11_{33}$ corresponding to the reception timing of a third user. The CDMA receiver further comprises residual signal producing sections $12_1$ and $12_2$.

A multiplexed signal 13 received by the CDMA receiver is supplied to the reception timing detecting section 10, the first-stage interference estimating sections $11_{11}$ through $11_{31}$, and the residual signal producing section $12_1$. The multiplexed signal 13 is a frame signal composed of a plurality of slots. At a predetermined position in the frame, a pilot symbol as predetermined pattern data is added before or after an information symbol of a predetermined length. The reception timing detecting section 10 detects the pilot symbol added to the multiplexed signal 13 to detect data reception timings of desired users. The reception timings thus detected are supplied as reception timings $14_1$ through $14_3$ to the first-stage interference estimating sections $11_{11}$ through $11_{31}$, the second-stage interference estimating sections $11_{12}$ through $11_{32}$, and the third-stage interference estimating sections $11_{13}$ through $11_{33}$ individually for the users, i.e., individually for the reception timings. In synchronism with the reception timings $14_1$ through $14_3$ detected by the reception timing detecting section 10 for the individual users, the first-stage interference estimating sections $11_{11}$ through $11_{31}$ multiply the multiplexed signal 13 by spread codes assigned to the individual users to extract data signals of the desired users, respectively. The data signals thus extracted are supplied as user signals $15_1$ through $15_3$ to the second-stage interference estimating sections $11_{12}$ through $11_{32}$ in a subsequent stage, respectively. In addition, the first-stage interference estimating sections $11_{11}$ through $11_{31}$ multiply the extracted user data signals again by the spread codes assigned to the users. Thus, signal components of the users contained in the multiplexed signal 13 are reproduced to obtain reproduction signals $16_1$ through $16_3$ which are supplied to the residual signal producing section $12_1$. The residual signal producing section $12_1$ is supplied with the multiplexed signal 13 in addition to the reproduction signals $16_1$ through $16_3$ and produces a residual signal 17 obtained by subtracting the reproduction signals $16_1$ through $16_3$ from the multiplexed signal 13. The residual signal 17 is used as an input signal to be subjected to interference removal in the second stage.

The residual signal 17 is supplied to the second-stage interference estimating sections $11_{12}$ through $11_{32}$ and the residual signal producing section $12_2$. In synchronism with the reception timings $14_1$ through $14_3$ detected by the reception timing detecting section 10 for the individual users, the second-stage interference estimating sections $11_{12}$ through $11_{32}$ multiply the residual signal 17 supplied thereto by the spread codes individually assigned to the users to despread the residual signal. Resultant signals (or despread signals) are weak in signal level. Therefore, in order to minimize errors produced in transmission-path estimation required upon demodulation, the user signals $15_1$ through $15_3$ supplied from the first-stage interference estimating sections $11_{11}$ through $11_{31}$ are added to the resultant signals to produce added user signals increased in ratio of the signal components of the desired users. Thus, data signals of the desired users are extracted. The data signals thus extracted are supplied as user signals $18_1$ through $18_3$ to the third-stage interference estimating sections $11_{13}$ through $11_{33}$ in a subsequent stage, respectively. In addition, the second-stage interference estimating sections $11_{12}$ through $11_{32}$ subtract, from the user data signals extracted thereat as demodulation signals, signal components corresponding to the user signals $15_1$ through $15_3$ previously added and multiply results of extraction again by the spread codes assigned to the users, respectively. Thus, signal components of the relevant users contained in the residual signal 17 are reproduced as reproduction signals $19_1$ through $19_3$ which are supplied to the residual signal producing section $12_2$. The residual signal producing section $12_2$ is supplied with the residual signal 17 in addition to the reproduction signals $19_1$ through $19_3$ and produces a residual signal 20 obtained by subtracting the reproduction signals $19_1$ through $19_3$ from the residual signal 17. The residual signal 20 is used as an input signal to be subjected to interference removal in the third stage.

Likewise, the third-stage interference estimating sections $11_{13}$ through $11_{33}$ extract desired user signals for the residual signal 20 and produce demodulation signals $21_1$ through $21_3$ of the desired users corresponding to the user signals $16_1$ through $16_3$ and $18_1$ through $18_3$ produced by the first- and the second-stage interference estimating sections $11_{11}$ through $11_{31}$ and $11_{12}$ through $11_{32}$, respectively. In this event, the residual signal 20 approaches nearer to zero than the residual signal 17 so that the third-stage interference estimating sections $11_{13}$ through $11_{33}$ produce the demodulation signals $21_1$ through $21_3$ from the added user signals after the interference is removed at maximum, respectively.

The above-mentioned technique related to the CDMA receiver is disclosed, for example, in Japanese Unexamined Patent Publication (JP-A) No. H10-190494 "INTERFEERENCE CANCELLER AND CHANNEL ESTIMATION".

However, in the conventional CDMA receiver already proposed, interference is not removed from the multiplexed signal itself supplied to the reception timing detecting section. Therefore, the reception timings of the desired users are detected from the reception signal containing interference waves at a great ratio. As a consequence, it is difficult to detect accurate reception timings. Furthermore, since the interference of the reception signal is removed with reference to such inaccurate reception timings, the reception quality is deteriorated to cancel the effect of interference removal.

SUMMARY OF THE INVENTION

It is therefore an object of this invention to provide a CDMA receiver which enables detection of accurate reception timings even in a condition that an SIR is low.

A CDMA receiver to which this invention is applicable is for receiving, as a reception signal, a signal given by subjecting a data signal comprising predetermined pattern data to spread modulation by the use of a spread code.

According to an aspect of this invention, the receiver comprises:

correlation value data producing means for producing correlation value data obtained by multiplying the reception signal by the spread code and the predetermined pattern data;

signal-to-interference ratio calculating means for calculating a signal-to-interference ratio of said reception signal; and reception timing determining means for determining a reception timing of said predetermined pattern data in response to said correlation value data and said signal-to-interference ratio.

Preferably, the reception timing determining means determines the reception timing such that the maximum value of the correlation value data exceeds a predetermined first threshold value and that the signal-to-interference ratio exceeds a predetermined second threshold value when the correlation value data have the maximum value.

The signal-to-interference ratio calculating means may calculate the signal-to-interference ratio from the reception signal and the correlation value data produced by the correlation value data producing means.

According to another aspect of this invention, the receiver comprises:

correlation value data producing means for producing, at each sampling point within a predetermined time range, correlation value data obtained by multiplying the reception signal by the spread code and the predetermined pattern data;

correlation value data memorizing means for memorizing, in correspondence to the above-mentioned each sampling point, the correlation value data produced by the correlation value data producing means;

signal-to-interference ratio calculating means for calculating a signal-to-interference ratio of the reception signal;

signal-to-interference ratio memorizing means for producing an interpolating signal-to-interference ratio for the signal-to-interference ratio calculated by the signal-to-interference ratio calculating means for each sampling point within the time range based on a reception timing at which the signal-to-interference ratio is calculated and for memorizing the interpolating signal-to-interference ratios in correspondence to the above-mentioned each sampling point;

retrieving means for retrieving maximum correlation value data among the correlation value data memorized in the correlation value data memorizing means;

correlation value data judging means for judging whether or not the maximum correlation value data retrieved by the retrieving means exceed a predetermined first threshold value;

ratio judging means for judging, when the correlation value data judging means judges that the maximum correlation value data exceed the first threshold value, whether or not a particular signal-to-interference ratio memorized in the signal-to-interference ratio memorizing means in correspondence to a particular sampling point of the maximum correlation value data exceeds a predetermined second threshold value; and reception timing determining means for determining, when the ratio judging means judges that the particular signal-to-interference ratio exceeds the second threshold value, a reception timing corresponding to the particular sampling point as a reception timing of the predetermined pattern data.

DESCRIPTION OF THE PREFERRED EMBODIMENTS

Now, this invention will be described in detail in conjunction with several embodiments.

First Embodiment

Figure 2:
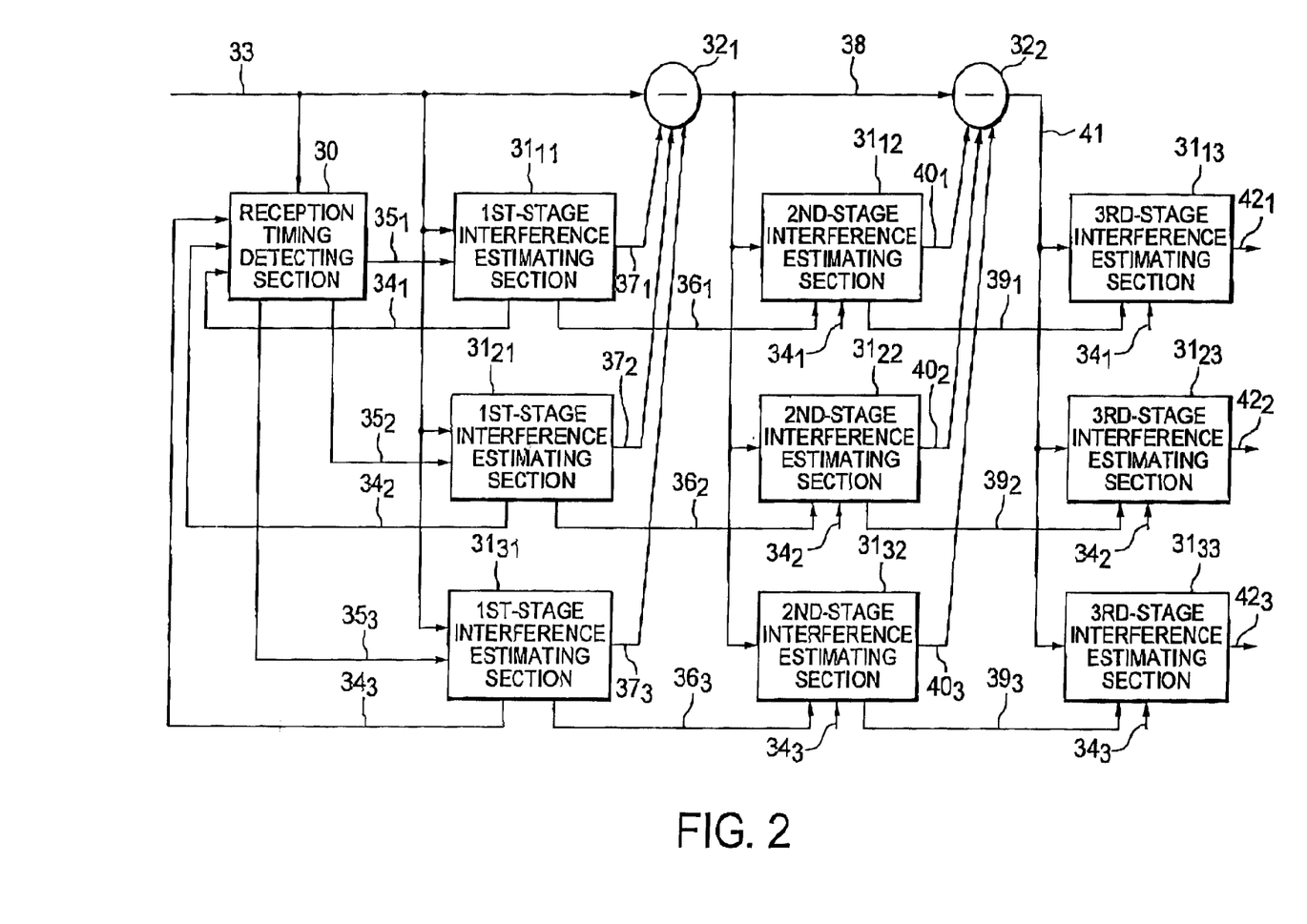
FIG. 2 is a view showing the structure of a CDMA receiver according to a first embodiment of this invention.

FIG. 2 shows the structure of a CDMA receiver according to a first embodiment of this invention. The CDMA receiver in the first embodiment is a CDMA receiver utilizing a multistage-type interference removing technique of repeating interference removal in three stages for three users. However, the number of users and the number of stages are not restricted at all. The CDMA receiver in the first embodiment comprises a reception timing detecting section 30 for detecting reception timings for three users, respectively, and interference estimating sections in each stage in correspondence to the reception timings. The interference estimating sections include first- through third-stage interference estimating sections $31_{11}$ through $31_{13}$ corresponding to the reception timing of the first user, first- through third-stage interference estimating sections $31_{21}$ through $31_{23}$ corresponding to the reception timing of the second user, and first- through third-stage interference estimating sections $31_{31}$ through $31_{33}$ corresponding to the reception timing of the third user. The CDMA receiver further comprises residual signal producing sections $32_1$ and $32_2$.

A multiplexed signal 33 received by the CDMA receiver is supplied to the reception timing detecting section 30, the first-stage interference estimating sections $31_{11}$ through $31_{31}$, and the residual signal producing section $32_1$. The multiplexed signal 33 is a frame signal composed of a plurality of slots. At a predetermined slot of the slots in the frame signal, a pilot symbol as predetermined pattern data is added before (or after) an information symbol (as information data) of a predetermined length. The reception timing detecting section 30 is supplied with SIR information $34_1$ through $34_3$ from the first-stage interference estimating sections $31_{11}$ through $31_{31}$, respectively. The SIR information $34_1$ through $34_3$ are SIRs measured in correspondence to the reception timings. By detecting the pilot symbols added to the multiplexed signal 33, the reception timing detecting section 30 corrects the data reception timings detected for the desired users with reference to the SIR information $34_1$ through $34_3$ corresponding thereto. Reception timing information $35_1$ through $35_3$ thus corrected are supplied to the first-stage interference estimating sections $31_{11}$ through $31_{31}$, the second-stage interference estimating sections $31_{12}$ through $31_{32}$, and the third-stage interference estimating sections $31_{13}$ through $31_{33}$.

The first-stage interference estimating sections $31_{11}$ through $31_{31}$ are adapted to produce reception timings obtained by preliminarily compensating a processing delay in the reception timing detecting section 30 and other internal propagation delays, and to correct reception timings as demodulation timings with reference to the reception timing information $35_1$ through $35_3$ supplied thereto for individual users. At the reception timings thus corrected, the first-stage interference estimating sections $31_{11}$ through $31_{31}$ carry out demodulation of the multiplexed signal 33 in correspondence to the users by multiplying the multiplexed signal 33 by spread codes assigned to the individual users. The demodulated data are supplied as reception data $36_1$ through $36_3$ of the desired users to the second-stage interference estimating sections $31_{12}$ through $31_{32}$ as a next stage. In addition, the first-stage interference estimating sections $31_{11}$ through $31_{31}$ again uses the spread codes assigned to the individual users to reproduce signal components of the relevant users contained in the multiplexed signal 33. The signal components thus reproduced are delivered as reproduction signals $37_1$ through $37_3$ to the residual signal producing section $32_1$. The residual signal producing section $32_1$ is supplied with the multiplexed signal 33 in addition to the reproduction signals $37_1$ through $37_3$ and produces a residual signal 38 obtained by subtracting the reproduction signals $37_1$ through $37_3$ from the multiplexed signal 33. The residual signal 38 is used as an input signal to be subjected to interference removal in the second stage.

The residual signal 38 is supplied to the second-stage interference estimating sections $31_{12}$ through $31_{32}$ and the residual signal producing section $32_2$. In synchronism with the reception timings for the individual users. The second-stage interference estimating sections $31_{12}$ through $31_{32}$ carry out despreading by multiplying the residual signal 38 supplied thereto by the spread codes individually assigned. Resultant signals have a small signal level.

Therefore, in order to minimize errors produced in transmission-path estimation required upon demodulation, the reception data $36_1$ through $36_3$ supplied from the first-stage interference estimating sections $31_{11}$ through $31_{31}$ are added thereto to produce added user signals increased in ratio of signal components of the desired users. Thus, data signals of the desired users are extracted. The data signals thus extracted are supplied as reception data $39_1$ through $39_3$ to the third-stage interference estimating sections $31_{13}$ through $31_{33}$. In addition, the second-stage interference estimating sections $31_{12}$ through $31_{32}$ subtract, from the extracted reception data demodulated data corresponding to the reception data $36_1$ through $36_3$ previously added and then multiply user data signals again by the spread codes assigned to the users, respectively. Thus, the signal components of the relevant users contained in the residual signal 38 are reproduced. These signal components are supplied as reproduction signals $40_1$ through $40_3$ to the residual signal producing section $32_2$. In addition to the reproduction signals $40_1$ through $40_3$, the residual signal producing section $32_2$ is supplied with the residual signal 38 and produces a residual signal 41 obtained by subtracting the reproduction signals $40_1$ through $40_3$ from the residual signal 38. The residual signal 41 is used as an input signal to be subjected to interference removal in the third stage.

In the similar manner, the third-stage interference estimating sections $31_{13}$ through $31_{33}$ extract desired user signals for the residual signal 41 and produce demodulation signals $42_1$ through $42_3$ of the desired users corresponding to the reception data $36_1$ through $36_3$ and $39_1$ through $39_3$ produced by the first- and the second-stage interference estimating sections $31_{11}$ through $31_{31}$ and $31_{12}$ through $31_{32}$, respectively. In this event, the residual signals 38 and 41 successively approach zero so that the third-stage interference estimating sections $31_{13}$ through $31_{33}$ produce the demodulation signals $42_1$ through $42_3$ from the added user signals after the interference is removed at maximum, respectively.

Now, description will be made about a characteristic part of the structure of the CDMA receiver in the first embodiment.

Figure 3:
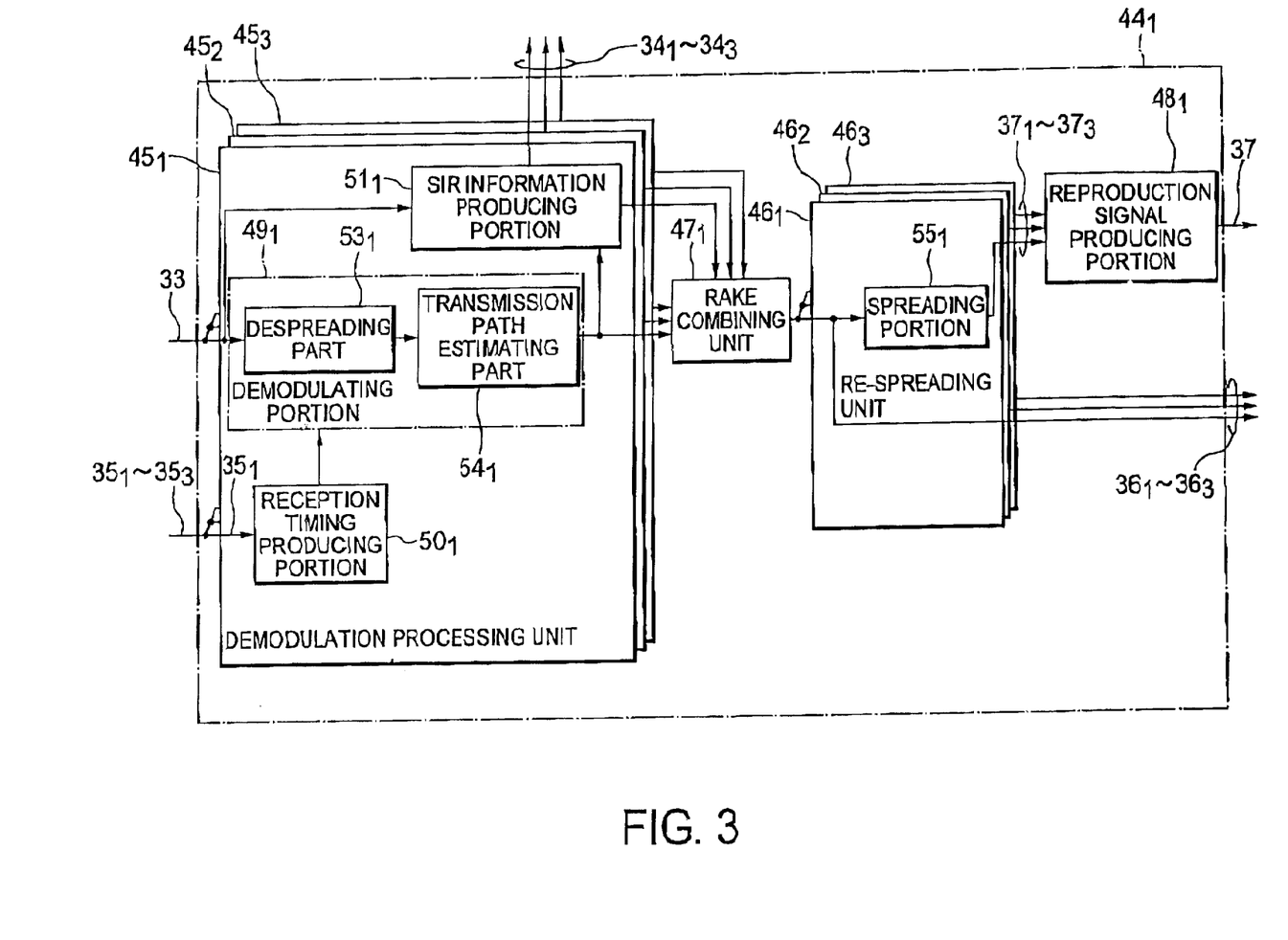
FIG. 3 is a block diagram showing a characteristic part of the structure of a first-stage interference estimating section in the first embodiment.

FIG. 3 shows the characteristic part of the first-stage interference estimating sections of the CDMA receiver in FIG. 2 according to the first embodiment. In FIG. 2, the first-stage interference estimating sections $31_{11}$ through $31_{31}$ are separately illustrated in correspondence to the reception timings detected for the individual users for which simultaneous demodulation is possible. On the other hand, these sections are integrated in FIG. 3 into a first-stage interference estimating section $44_1$. The first-stage interference estimating section $44_1$ has demodulation processing units $45_1$ through $45_3$ and re-spreading units $46_1$ through $46_3$ for the reception timings, respectively, and comprises a RAKE combining unit $47_1$ and a reproduction signal producing unit $48_1$ in common to all of the reception timings. The demodulation processing units $45_1$ through $45_3$ are similar in structure to one another. The re-spreading units $46_1$ through $46_3$ are similar in structure to one another. Although three timings are herein illustrated, the number of timings is not restricted in principle as far as the constraint in mounting is eliminated. Hereinafter, the demodulation processing unit $45_1$ and the re-spreading unit $46_1$ will be described among these demodulation processing units and these re-spreading units.

The demodulation processing unit $45_1$ comprises a demodulating portion $49_1$ for demodulating an input signal, a reception timing producing portion $50_1$ for producing a demodulation timing of the demodulating portion $49_1$, and an SIR information producing portion $51_1$ for measuring an SIR of the input signal to produce SIR information. The demodulating portion $49_1$ comprises a dispreading part $53_1$ and a transmission-path estimating part $54_1$. The demodulation processing unit $45_1$ is supplied with the multiplexed signal 33. The dispreading part $53_1$ of the demodulating portion $49_1$ multiplies the multiplexed signal by the spread code of a predetermined user to extract a desired user signal. The transmission-path estimating part $54_1$ calculates transmission-path characteristic information by the use of a pilot symbol known to be preliminarily contained in the reception signal and compensates despread data with reference to the transmission-path characteristic information. Such demodulation by the demodulation portion $49_1$ is carried out in synchronism with the reception timing producing portion $50_1$. The reception timing producing portion $50_1$ produces the reception timing obtained by preliminarily compensating the processing delay of the reception timing detecting section 30 or other internal propagation delays, and further corrects the reception timing with reference to the reception timing information $35_1$. For example, the reception timing produced as mentioned above preliminarily considering the delay is used as a base and corrected with reference to the reception timing information $35_1$. The SIR information producing portion $51_1$ calculates a signal-to-interference ratio for a signal component which is the despread data despread by the demodulating portion $49_1$ and for an interference component which is a remaining component of the reception signal other than the signal component, and produces SIR information representative of the ratio. The SIR information is supplied to the RAKE combining unit $47_1$ and, in the first-stage interference estimating section $44_1$, further to the reception timing detecting section 30.

The RAKE combining unit $47_1$ is supplied with the despread data despread by the demodulating portion $49_1$ and carries out maximum ratio synthesis with reference to the SIR information produced by the SIR information producing portion $51_1$ for the individual reception timings. Specifically, weighted synthesis given by "$SIR_1 \times S_1 + SIR_2 \times S_2 + SIR_3 \times S_3$" is carried out where $S_1$ through $S_3$ and $SIR_1$ through $SIR_3$ represent the despread data and the SIR information of the individual users, respectively The synthesized output of the RAKE combining unit $47_1$ is supplied to the re-spreading units $46_1$ through $46_3$.

The re-spreading unit $46_1$ comprises a spreading portion $55_1$. The synthesized output of the RAKE combining unit $47_1$ supplied to the re-spreading unit $46_1$ is directly outputted as the reception data $36_1$. The spreading portion $55_1$ multiplies the synthesized output again by the spread code corresponding to each individual user to produce a spread signal. The spread signal is supplied as the reproduction signal $37_1$ to the reproduction signal producing unit $48_1$. The reproduction signal producing unit $48_1$ is supplied with the reproduction signals $37_1$ through $37_3$ produced for the individual reception timings and combines these signals to reproduce a signal with the individual timings taken into account, as is equivalent to the multiplexed signal 33. The reproduction signal 37 herein reproduced is delivered to the residual signal producing section $32_1$. Actually, the residual signal producing section $32_1$ produces the residual signal 38 by subtracting from the multiplexed signal 33 the reproduction signal 37 with the individual timings taken into account.

As described above, the first-stage interference estimating section $44_1$ corrects the demodulation timing with reference to the reception timing information and produces the demodulated data and the reproduced data. The second- and the third-stage interference estimating sections $44_2$ and $44_3$ are similar in structure and different from the first-stage interference estimating section $44_1$ in that the demodulated data of the preceding stage are supplied and correction of the demodulation timings is not carried out.

Figure 4:
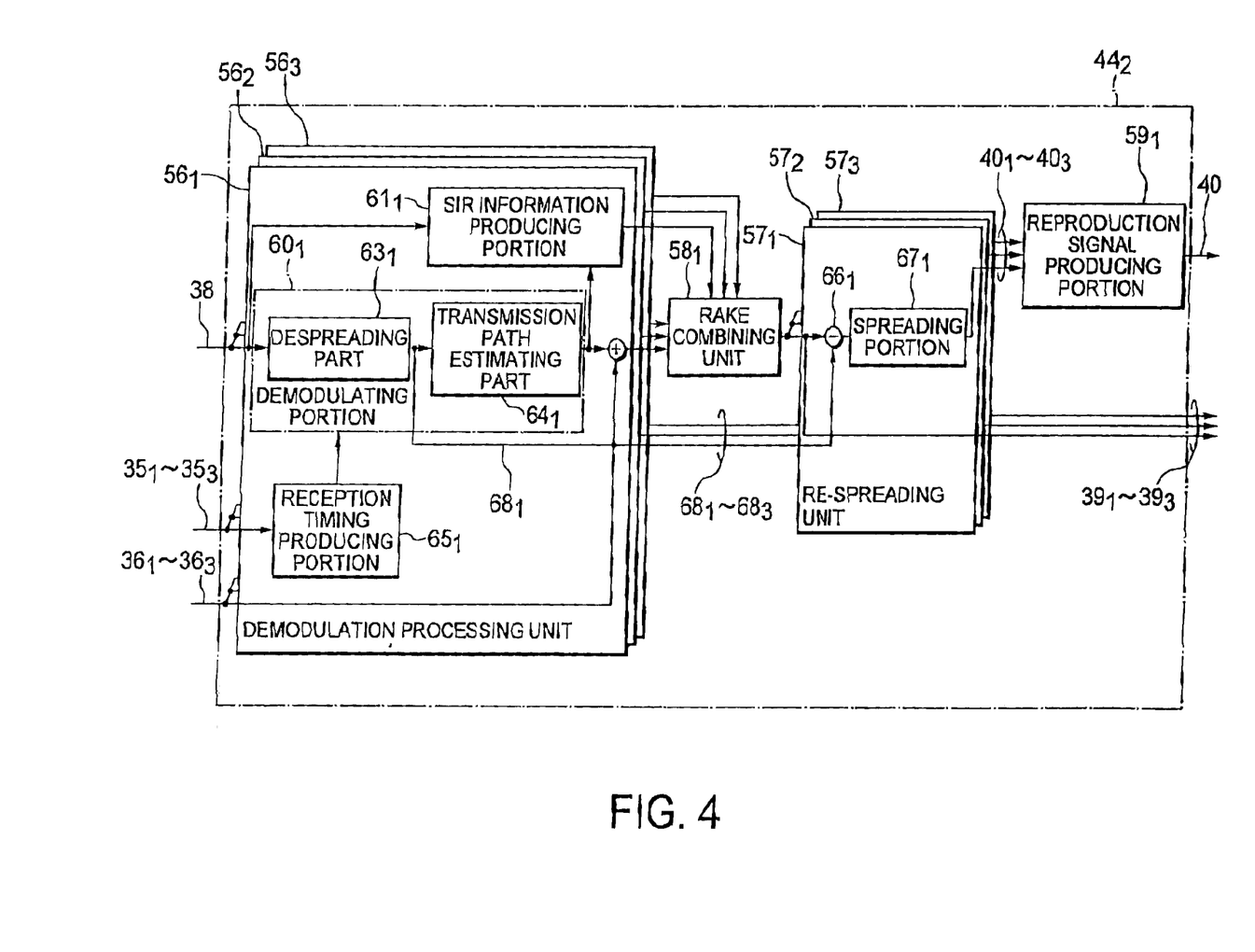
FIG. 4 is a block diagram showing a characteristic part of the structure of a second-stage interference estimating section in the first embodiment.

FIG. 4 shows the characteristic part of the second-stage interference estimating sections of the CDMA receiver in FIG. 2 according to the first embodiment. In FIG. 2, the second-stage interference estimating sections $31_{12}$ through $31_{32}$ are separately illustrated in correspondence to the reception timings detected for the individual users for which simultaneous demodulation is possible. On the other hand, these sections are integrated in FIG. 4 into a second-stage interference estimating section $44_2$. The second-stage interference estimating section $44_2$ has demodulation processing units $56_1$ through $56_3$ and re-spreading units $57_1$ through $57_3$ for the reception timings, respectively, and comprises a RAKE combining unit $58_1$ and a reproduction signal producing unit $59_1$ in common to all of the reception timings. The demodulation processing units $56_1$ through $56_3$ are substantially similar in structure to one another. The re-spreading units $57_1$ through $57_3$ are similar in structure to one another. The demodulation processing unit $56_1$ comprises a demodulating portion $60_1$ for demodulating an input signal, an SIR information producing portion $61_1$ for measuring an SIR of the input signal to produce SIR information, and an adder portion $62_1$. The demodulating portion $60_1$ comprises a dispreading part $63_1$ and a transmission-path estimating part $64_1$. The demodulation processing unit $56_1$ further comprises a reception timing producing portion $65_1$ for producing a demodulation timing of the demodulating portion. Although three timings are herein illustrated, the number of timings is not restricted in principle as far as the constraint in mounting is eliminated. The second-stage interference estimating section $44_2$ is substantially similar in structure to the first-stage interference estimating section $44_1$. Therefore, different parts alone will be described.

The demodulation processing unit $56_1$ is supplied with the residual signal 38 and the reception timing produced by the reception timing producing portion $65_1$. Demodulation by the demodulating portion $60_1$ is carried out in synchronism with the reception timing produced by the reception timing producing portion $65_1$. The reception timing producing portion $65_1$ produces the reception timing obtained by preliminarily compensating the processing delay of the reception timing detecting section 30 and other internal propagation delays, and further corrects the reception timing with reference to the reception timing information $35_1$. For example, the reception timing produced preliminarily taking the delay into account is used as a base and corrected with reference to the reception timing information $35_1$. The demodulating portion $60_1$ of the demodulating processing unit $56_1$ carries out despreading in synchronism with the spread code preliminarily assigned to the user to extract a desired user signal. The despread data despread by the demodulating portion $60_1$ are supplied to the adder portion $62_1$. The adder portion $62_1$ is supplied from the first-stage interference estimating section $44_1$ with the reception data $36_1$ corresponding to the reception timing and adds the reception data $36_1$ to the despread data. This increases the ratio of the signal component of each individual user contained in the weak residual signal 38 supplied to the second-stage interference estimating section $44_2$ as the input signal to be subjected to interference removal, and enhances the accuracy of the demodulation signal. The result of addition in the adder portion $62_1$ is supplied to the RAKE combining unit $58_1$.

The re-spreading unit $57_1$ comprises a subtracter portion $66_1$ and a spreading portion $67_1$. The re-spreading unit $57_1$ directly outputs, as the reception data $39_1$ the synthesized output obtained by maximum ratio synthesis in the RAKE combining unit $58_1$. Supplied with the synthesized output obtained by maximum ratio synthesis by the RAKE combining unit $58_1$ and with a despread signal $68_1$ obtained by despreading by the despreading part $63_1$ in the demodulating portion $60_1$ of the demodulation processing unit $56_1$. The subtracter portion $68_1$ of the re-spreading unit $57_1$ subtracts the despread signal $68_1$ from the maximum synthesized ratio output. The result of subtraction is supplied to the spreading portion $67_1$. The spreading portion $67_1$ multiplies the subtraction result by the spread code corresponding to each individual user to produce a spread signal The spread signal is supplied as the reproduction signal $40_1$ to the reproduction signal producing unit $59_1$. The reproduction signal producing unit $59_1$ is supplied with the reproduction signals $40_1$ through $40_3$ produced for the individual reception timings and combines these signals to reproduce a signal with the individual timings taken into account, as is equivalent to the residual signal 38. The reproduction signal 40 herein reproduced is delivered to the residual signal producing section $32_2$. Actually, the residual signal producing section $32_2$ produces the residual signal 41 by subtracting, from the residual signal 38, the reproduction signal 40 with the individual reception timings taken into account.

Thus, the second-stage interference estimating section $44_2$ corrects the reception data $36_1$ through $36_3$ from the first stage and delivers the corrected data to the third stage. A combination of the third-stage interference estimating sections $31_{13}$ through $31_{33}$ (FIG. 2) similarly operates to obtain the reception data $42_1$ through $42_3$ for the individual users.

Next, description will be made in detail about a characteristic part of the reception timing detecting section 30 of FIG. 2.

Figure 5:
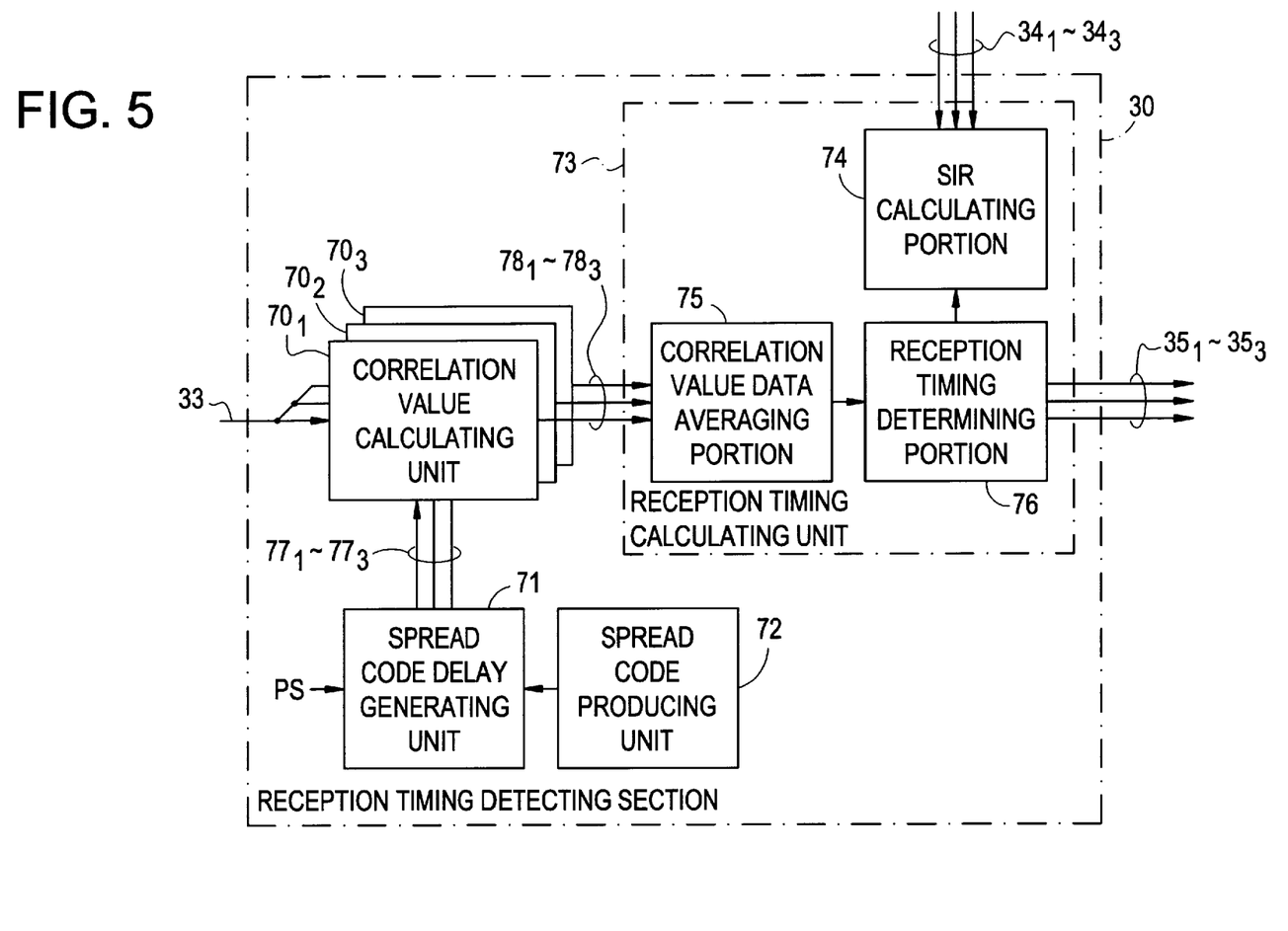
FIG. 5 is a block diagram showing a characteristic part of the structure of a reception timing detecting section in the CDMA receiver according to the first embodiment.

FIG. 5 shows the characteristic part of the reception timing detecting section 30 of the CDMA receiver in the first embodiment. The reception timing detecting section 30 has correlation value calculating units $70_1$ through $70_3$ for the individual reception timings and comprises a spread code delay generating unit 71, a spread code producing unit 72, and a reception timing calculating unit 73 in common to all of the reception timings. Although the correlation value calculating units $70_1$ through $70_3$ are provided for the three timings, the number of timings is not restricted in principle as far as the constraint in mounting is eliminated. The reception timing calculating unit 73 comprises an SIR calculating portion 74, a correlation value data averaging portion 75, and a reception timing determining portion 76. The spread code producing unit 72 produces the predetermined spread codes for the individual users. The spread code delay generating unit 71 multiplies the spread codes of the individual users produced by the spread code producing unit 72 by the pilot symbol PS as the predetermined (or fixed) pattern data. For each user, the length of the pilot symbol is extracted from the spread code having a predetermined pattern length and is used in multiplication. By shifting the position of extracting the spread code over the width of a predetermined sampling period within a range of a reception timing detectable period, predetermined signal reproduction signals $77_1$ through $77_3$ are obtained with the spread codes delayed. The correlation value calculating units $70_1$ through $70_3$ multiply the multiplexed signal 33 by the predetermined signal reproduction signals $77_1$ through $77_3$ supplied thereto, respectively, to calculate correlation data $78_1$ through $78_3$ as cross-correlation values therebetween within the reception timing detectable period. The correlation data $78_1$ through $78_3$ are cross-correlation values corresponding in number to sampling times. The correlation value data averaging portion 75 of the reception timing calculating unit 73 carries out averaging over a predetermined time duration for each sampling and produces a correlation value table.

Figure 6:
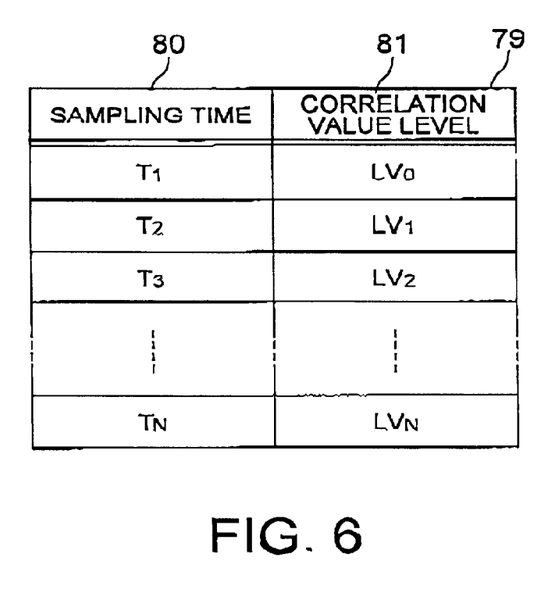
FIG. 6 is a view for describing a table structure of a correlation value table in the first embodiment.

FIG. 6 shows a table structure of the correlation value table 79 produced by the correlation value data averaging portion 75. The correlation value table 79 stores sampling times 80 and correlation value levels 81 corresponding thereto. As described above, the correlation value data averaging portion 75 carries out averaging upon the correlation data $78_1$ through $78_3$ produced by the correlation value calculating units $70_1$ through $70_3$ over the predetermined time duration for each sampling. For example, it is assumed that N times of sampling is possible within the reception timing detectable period. Then, correlation data average values $LV_0$ through $LV_N$ taken over the predetermined time duration for the sampling times $T_1$ through $T_N$, respectively, are stored in the correlation value table 79 in correspondence to the sampling times.

Turning to FIG. 5, description will continue. Since the SIR information $34_1$ through $34_3$ supplied from the first-stage interference estimating section $44_1$ correspond in number to the reception timings, the SIR calculating portion 74 calculates, by linear interpolation and averaging, the SIR information at the sampling times within the predetermined time range between time instants before and after the reception timing. The SIR information thus calculated is stored in an SIR information table.

Figure 7:
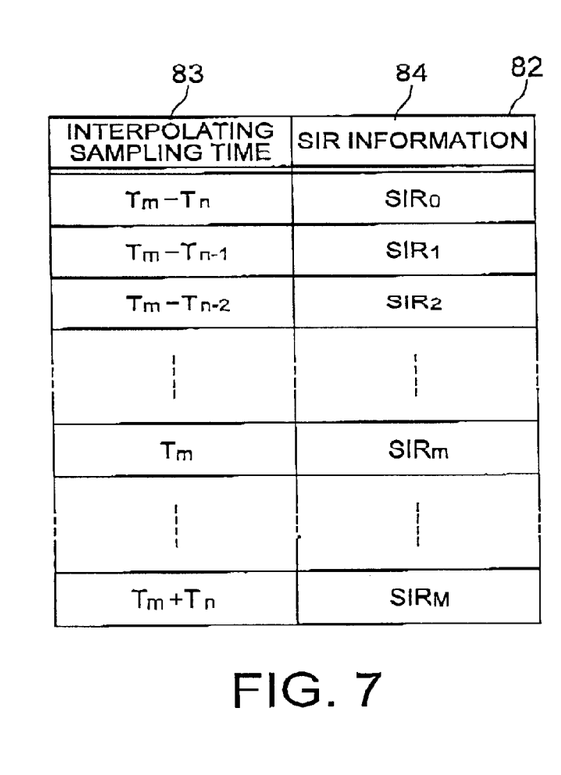
FIG. 7 is a view for describing a table structure of an SIR information table in the first embodiment.

FIG. 7 shows a table structure of the SIR information table 82 produced by the SIR calculating portion 74. For each sampling time 83 at which the above-mentioned interpolation is carried out, the SIR information table 82 stores the SIR information 84 as interpolated values corresponding thereto. It is assumed that the reception timing is located at a position $T_m$ on a time axis.

Then, for a plurality of interpolation sampling times within the time range between "$T_m-t_n$" and "$T_m+t_n$" before and after the reception timing, the SIR information is calculated by linear interpolation and averaging from the SIR information $34_1$ through $34_3$ corresponding in number to the reception timings and stored as $SIR_0$ through $SIR_M$.

The reception timing determining portion 76 of the reception timing calculating unit 73 determines the reception timing for demodulation with reference to the information stored in the correlation value table produced by the correlation value data averaging portion 75 and the SIR information table produced by the SIR calculating portion 74.

Figure 8:
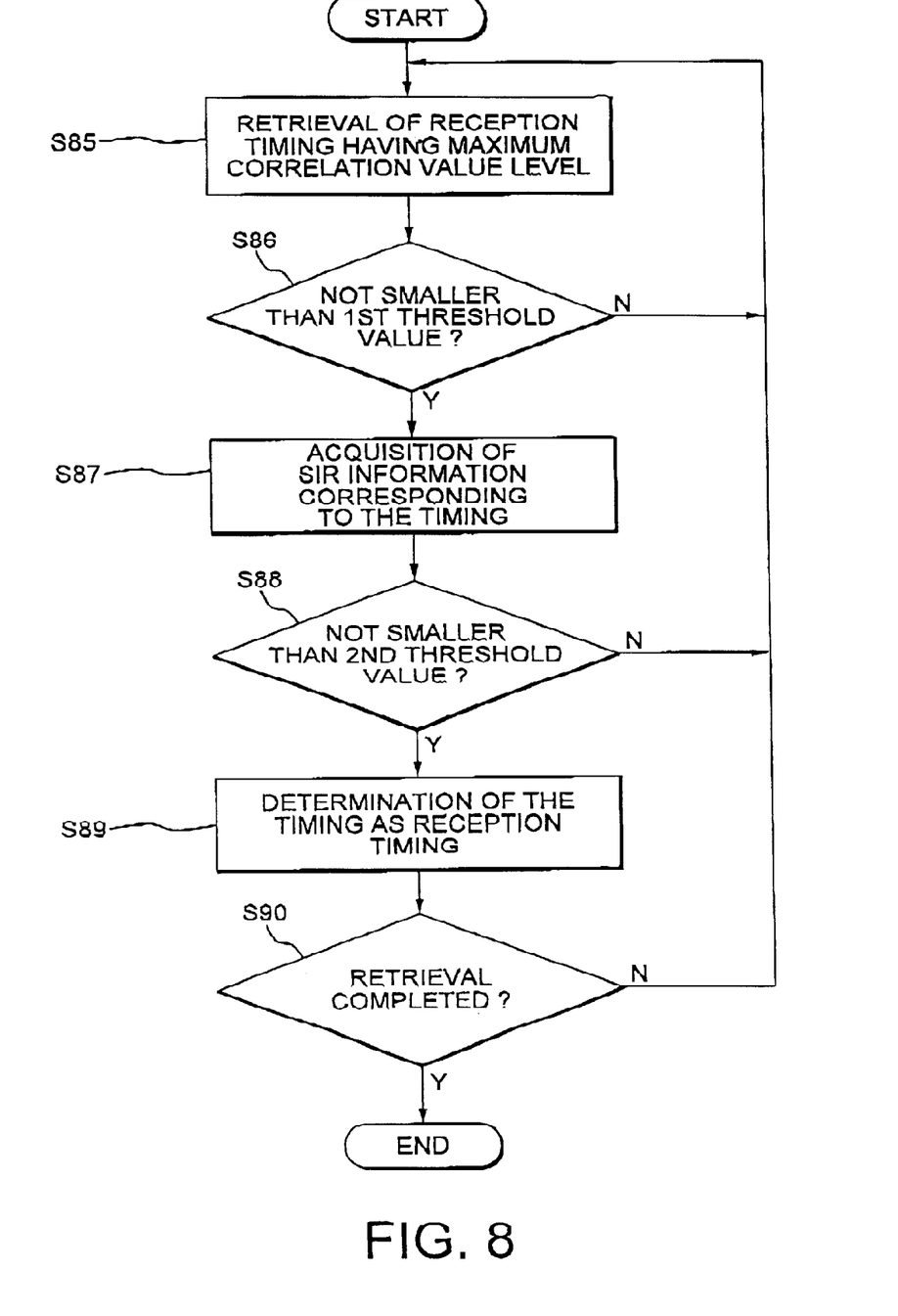
FIG. 8 is a flow chart showing the content of determination of a reception timing in a reception timing determining portion in the first embodiment.

FIG. 8 shows the content of reception timing determination at the reception timing determining portion 76. At first, the reception timing determining portion 76 refers to the correlation value table 79 illustrated in FIG. 6 and retrieves a particular sampling time having a maximum correlation value level (step S85). Then, judgement is made about whether or not the maximum correlation value level is not smaller than a predetermined first threshold value (step S86). If it is judged that the maximum correlation value level is not smaller than the first threshold value (Y in step S86), the SIR information table 82 illustrated in FIG. 7 is searched from the sampling time corresponding to the maximum correlation value level to retrieve the interpolated sampling time corresponding thereto. Since the reception timing is preliminarily known upon preparation of the SIR information table, it is easy to establish the correspondence between the interpolated sampling time 83 of the SIR information within the predetermined range and the sampling time 80 in FIG. 6. Therefore, the interpolated sampling time 83 corresponding to the sampling time is identified and the SIR information stored in correspondence to the interpolated sampling time can be retrieved (S87). If it is judged in the step S86 that the first threshed value is not exceeded (N in step S86), the operation returns to the step S85 to retrieve the next reception timing.

Next, judgement is made about whether or not the SIR information retrieved in the step S87 is not smaller than a predetermined second threshold value (step S88). If it is judged that the SIR information is not smaller than the second threshold value (Y in step S88), the timing in question is determined as the reception timing (step S89). If it is judged in the step S88 that the second threshold value is not exceeded (N in the step S88), the operation returns to the step S85 to retrieve the next reception timing. Finally, judgement is made about completion of retrieval, i.e., whether or not the reception timings of a required number have been determined or whether or not the correlation value table has been completely retrieved. If no further retrieval is required (Y in step S90), a series of operations are finished (END). On the other hand, if any further retrieval is required, the operation returns to the step S85 to retrieve the next reception timing.

As described above, in the CDMA receiver according to the first embodiment, the SIR information table including interpolation before and after the reception timing is prepared by the use of the SIR information measured by the first-stage interference estimating section $44_1$ for each individual user. Furthermore, for the reception signal, the correlation value table is provided to store the correlation value with the pilot symbol to be used as the reception timing in correspondence to each sampling time within a range of the reception timing detectable period. Thus, correction into an optimum reception timing is made. Therefore, even in case where the multistage interference removal of a multi-user type is carried out, it is possible to eliminate the influence of the interference component from the reception timing and to carry out interference removal with reference to the accurate reception timing.

Second Embodiment

The CDMA receiver according to the first embodiment is applied to the multistage interference removal but this invention is not restricted thereto. In a second embodiment, illustration is made of a CDMA receiver which is not applied to the multistage interference removal.

Figure 9:
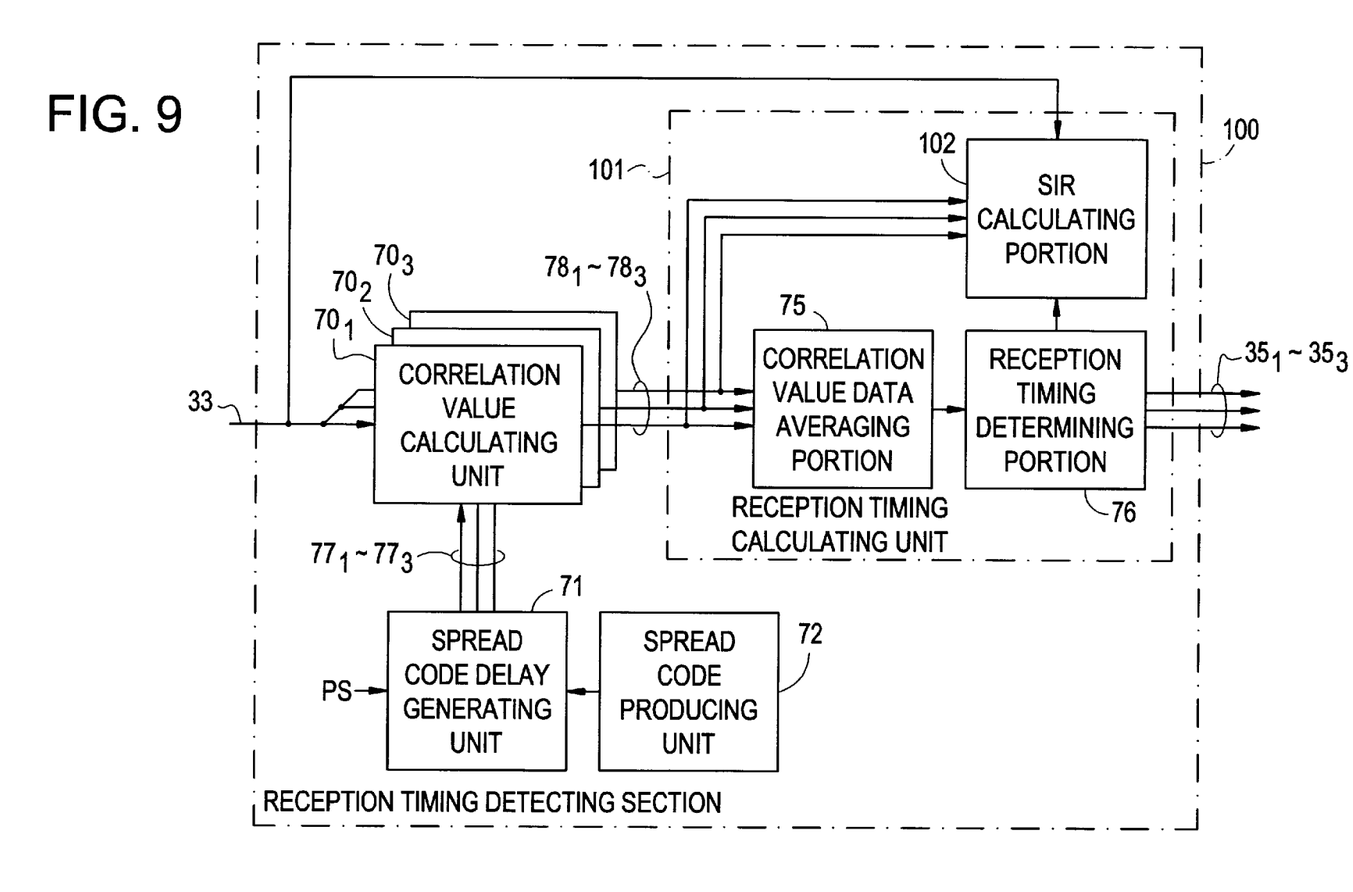
FIG. 9 is a block diagram showing a characteristic part of the structure of a reception timing detecting section of a CDMA receiver according to a second embodiment.

FIG. 9 shows a characteristic part of a reception timing detecting section of the CDMA receiver according to the second embodiment of this invention. Similar parts are designated by like reference numerals as those of the reception timing detecting section 30 in FIG. 2 according to the first embodiment and the description thereof will appropriately be omitted. The reception timing detecting section 100 in the second embodiment has correlation value calculating units $70_1$ through $70_3$ for individual reception timings and comprises a spread code delay generating unit 71, a spread code producing unit 72, and a reception timing calculating unit 101 in common to all of the reception timings. The reception timing calculating unit 101 comprises an SIR calculating portion 102, a correlation value data averaging portion 75, and a reception timing determining portion 76. The spread code producing unit 72 produces the predetermined spread codes for the individual users. The spread code delay generating unit 71 multiplies the spread codes of the individual users produced by the spread code producing unit 72 by the pilot symbol PS as the predetermined pattern data. For each user, the length of the pilot symbol is extracted from the spread code having a predetermined pattern length and is used in multiplication. By shifting the position of extracting the spread code over the width of a predetermined sampling period within a range of a reception timing detectable period, predetermined signal reproduction signals $77_1$ through $77_3$ are obtained with the spread codes delayed. The correlation value calculating units $70_1$ through $70_3$ multiply the multiplexed signal 33 by the predetermined signal reproduction signals $77_1$ through $77_3$ supplied thereto, respectively, to calculate correlation data $78_1$ through $78_3$ as cross-correlation values therebetween within the reception timing detectable period. The correlation data $78_1$ through $78_3$ are cross-correlation values corresponding in number to sampling times. The correlation value data averaging portion 75 of the reception timing calculating unit 73 carries out averaging over a predetermined time duration for each sampling and produces a correlation value table illustrated in FIG. 6.

The SIR calculating portion 102 calculates SIRs at all sampling points from the multiplexed signal 33 and the correlation value data $78_1$ through $78_3$ corresponding in number to the reception timings. The SIRs are subjected to linear interpolation and averaging for a predetermined period to calculate the SIR information at sampling times in a predetermined time range before and after the reception timing. The SIR information thus calculated is stored in a SIR information table illustrated in FIG. 7, in the manner similar to the first embodiment.

The reception timing determining portion 76 of the reception timing calculating unit 101 determines the reception timing for demodulation with reference to the information stored in the correlation value table produced by the correlation value data averaging portion 75 and the SIR information table produced by the SIR calculating portion 102. The operation is similar to that illustrated in FIG. 8 and will not be described. For example, the reception timing thus determined may be outputted as the reception timing information for making the reception timing producing section produce the accurate reception timing as described in the first embodiment or may be delivered directly as the reception timing to a demodulator not illustrated in the figure. Thus, the mode of output is not restricted.

In the CDMA receiver of the second embodiment, the reception timing detecting section produces the SIR information table from the multiplexed signal and the correlation value data. Therefore, it is unnecessary for the first-stage interference estimating section to refer to the SIR information as in the first embodiment. This contributes to a reduction in size of the receiver. The above-mentioned reception timing detecting section can notify the accurate reception timing not only to the CDMA receiver using the above-mentioned multistage interference removal but also to other types of receivers.

In the first embodiment, description has been directed to application to the multistage interference removing technique of repeating the interference removal for three users in three stages. However, the number of users and the number of stages are not restricted at all.

As described above, according to this invention, the demodulation timing of the reception multiplexed signal is corrected with reference to the correlation value detected as the reception timing and the SIR in the actual demodulation signal. Therefore, even if the SIR is low, the optimum reception timing can be detected so that the reception quality is improved. In addition, it is possible to lower the SIR required to obtain a predetermined reception quality. Therefore, the transmission power of a mobile terminal in a CDMA mobile communication system can be lowered. This contributes to a reduction in size of the terminal and to low the power consumption. Since the transmission power at each user is lowered, it is possible to increase the number of users for which multiplexing in a same frequency is possible.

What is claimed is:

1. A CDMA receiver for receiving, as a reception signal, a signal given by subjecting a data signal comprising predetermined pattern data to spread modulation by the use of a spread code, said receiver comprising:

correlation value data producing means for producing correlation value data obtained by multiplying said reception signal by said spread code and said predetermined pattern data;

demodulating means for demodulating said reception signal to extract a desired user signal;

signal-to-interference ratio producing means for producing signal-to-interference ratio information for said reception signal based on the desired user signal provided by the demodulating means and transmission path characteristic information;

signal-to-interference ratio calculating means for calculating a signal-to-interference ratio of said reception signal based on the signal-to-interference ratio information provided by the signal-to-interference ratio producing means;

reception timing determining means for determining a reception timing of said predetermined pattern data in response to said correlation value data and said signal-to-interference ratio;

transmission path estimating means for calculating the transmission path characteristic information by use of a pilot symbol that is contained in the reception signal; and correlation value data averaging means for averaging the correlation data over a predetermined time duration to obtain averaged correlation data;

wherein the reception timing determining means determines the reception timing of said predetermine pattern data in response to said averaged correlation data and said signal-to-interference ratio.

2. A CDMA receiver for receiving, as a reception signal, a signal given by subjecting a data signal comprising predetermined pattern data to spread modulation by the use of a spread code, said receiver comprising:

correlation value data producing means for producing, at each sampling point within a predetermined time range, correlation value data obtained by multiplying said reception signal by said spread code and said predetermined pattern data;

correlation value data storing means for storing, in correspondence to said each sampling point, said correlation value data produced by said correlation value data producing means;

signal-to-interference ratio calculating means for calculating a signal-to-interference ratio of said reception signal;

signal-to-interference ratio storing means for producing an interpolating signal-to-interference ratio for said signal-to-interference ratio calculated by said signal-to-interference ratio calculating means for each sampling point within said time range based on a reception timing at which said signal-to-interference ratio is calculated and for storing the interpolating signal-to-interference ratios in correspondence to said each sampling point;

retrieving means for retrieving maximum correlation value data among said correlation value data stored in said correlation value data storing means;

correlation value data judging means for judging whether or not the maximum correlation value data retrieved by said retrieving means exceed a predetermined first threshold value;

ratio judging means for judging, when said correlation value data judging means judges that said maximum correlation value data exceed said first threshold value, whether or not a particular signal-to-interference ratio stored in said signal-to-interference ratio storing means in correspondence to a particular sampling point of said maximum correlation value data exceeds a predetermined second threshold value; and reception timing determining means for determining, when said ratio judging means judges that said particular signal-to-interference ratio exceeds said second threshold value, a reception timing corresponding to said particular sampling point as a reception timing of said predetermined pattern data.

3. A CDMA receiver for receiving, as a reception signal, a signal given by subjecting a data signal comprising predetermined pattern data to spread modulation by the use of a spread code, said receiver comprising:

a correlation value data producing unit that is configured to produce correlation value data obtained by multiplying said reception signal by said spread code and said predetermined pattern data;

a demodulating unit that is configured to demodulate said reception signal to extract a desired user signal;

a signal-to-interference ratio producing unit that is configured to produce signal-to-interference ratio information for said reception signal based on the desired user signal provided by the demodulating unit and transmission path characteristic information;

a signal-to-interference ratio calculating unit that is configured to calculate a signal-to-interference ratio of said reception signal based on the signal-to-interference ratio information provided by the signal-to-interference ratio producing unit; and a reception timing determining unit that is configured to determine a reception timing of said predetermined pattern data in response to said correlation value data and said signal-to-interference ratio;

a transmission path-estimating unit configured to calculate the transmission path characteristic information by use of a pilot symbol that is contained in the reception signal; and a correlation value data averaging unit configured to average the correlation data over a predetermined time duration to obtain averaged correlation data;

wherein the reception timing determining unit determines the reception timing of said predetermine pattern data in response to said averaged correlation data and said signal-to-interference ratio.

* * * * *